United States Patent [19]

Nakao et al.

[11] Patent Number: 5,909,521
[45] Date of Patent: Jun. 1, 1999

[54] MULTI-SHOT STILL IMAGE READER

[75] Inventors: Toshiyasu Nakao; Hisao Hayashi, both of Tokyo, Japan

[73] Assignee: NEC Corporation, Japan

[21] Appl. No.: 08/799,456

[22] Filed: Feb. 13, 1997

[30] Foreign Application Priority Data

Feb. 14, 1996 [JP] Japan .................................. 8-026350
Mar. 11, 1996 [JP] Japan .................................. 8-052694

[51] Int. Cl.$^6$ .................................................. G06K 9/22
[52] U.S. Cl. ............................................................ 382/312
[58] Field of Search ................................... 382/312, 313, 382/314, 315, 321, 322, 323, 324

[56] References Cited

U.S. PATENT DOCUMENTS

| | | | |
|---|---|---|---|
| 4,804,949 | 2/1989 | Faulkerson ............................. | 382/313 |
| 4,901,364 | 2/1990 | Faulkerson et al. .................... | 382/313 |
| 4,949,391 | 8/1990 | Faulkerson et al. .................... | 382/313 |
| 5,115,227 | 5/1992 | Keiji ....................................... | 382/313 |
| 5,227,909 | 7/1993 | Watson ................................... | 382/313 |
| 5,235,651 | 8/1993 | Nafarieh ................................. | 382/313 |
| 5,335,090 | 8/1994 | Yamada et al. ......................... | 382/313 |
| 5,355,146 | 10/1994 | Chiu et al. .............................. | 382/313 |

FOREIGN PATENT DOCUMENTS 3-96081  4/1991  Japan .
6-259557  9/1994  Japan .

OTHER PUBLICATIONS

K. Aizawa, et al., "Acquisition of Super High Definition Pictures by Processing Stereoscopic Images", Technical Journal IE90–54, IEICE (the Institute of Electronics, Information and Communication Engineers), pp. 23–28.

K. Uehira, "High Speed Still Image Reader Using Optically Coupled Multi Area Sensors", the Journal of the IIEEJ (Institute of Image Electronics Engineers of Japan), vol. 20, No. 3, (1991), pp. 203–208.

Sekiguchi, et al., "A Development of a Wide Scope Mosaic CCD Camera and a Prospect of Observational Cosmology", BUTSURI, The Physical Society of Japan, vol. 47, No. 5, (1992), pp. 376–381.

Y. Okada, et al., "A Hand–Scan Image Digitizer With An Ability for Realtime Assembling of Mosaic Pictures", Technical Journal EI81–17, IEICE, pp. 1–6.

"ACM Computing Surveys '92", Computer Science, Kyoritsu Shuppan Co., Ltd., (1994), pp. 77–119.

"Image Analysis Handbook", Tokyo University Press, pp. 462–467.

*Primary Examiner*—Jose L. Couso
*Attorney, Agent, or Firm*—Ostrolenk, Faber, Gerb & Soffen, LLP

[57] ABSTRACT

In order to provide a still image reader enabling easy acquisition of high resolution image data of a desired scope, sufficiently portable and not expensive at the same time, a multi-shot still image reader of the invention comprises a position detector (11) for detecting each position of the camera unit (10) from where each of the plurality of partial images is taken; a frame for unitizing the position detector (11) and the camera unit (10) and enabling displacement of the camera unit (10) parallel to the object; and means (14) for calculating candidate vectors for each of the plurality of partial images, a correction vector giving a correct position where said each of the plurality of partial images is to be synthesized being selected among said candidate vectors.

9 Claims, 13 Drawing Sheets

| i | INITIAL POSITION | CORRECTION VECTOR |
|---|---|---|
| 1 | (X1, Y1) | (CX1, CY1) |
| 2 | (X2, Y2) | (CX2, CY2) |
| ⋮ | ⋮ | ⋮ |
| n | (Xn, Yn) | (CXn, CYn) |
| ⋮ | ⋮ | ⋮ |

100 : IMAGE READING UNIT

MULTI-SHOT STILL IMAGE READER

BACKGROUND OF THE INVENTION

The present invention relates to a still image reader for obtaining still image data to be processed in a computer, wherein still image data of an optional scope are synthesized with data of partial images of an object obtained by an image input device.

Image input devices applied for obtaining still image data to be processed in a computer can be grouped into two categories according to types of image sensor applied therein, electronic still cameras and image scanners.

The electronic still camera, which can take an image with one shot without any mechanical structure for scanning the object, has superiority in its portability and handiness. On the other side, unable to take image of a wide scope with sufficient resolution, there is a problem that the object size should be limited in a narrow scope for extracting necessary information thereof, with the electronic still camera. Therefore, the electronic still camera, its resolution depending on a limited number of pixels of the two-dimensional area sensor applied therein, is regarded as inadequate for obtaining image data of precise pictures such as character documents or drawings.

On the contrary, in the image scanners such as flatbed type scanners or handy type scanners, there are problems of portability and limitation of scanning size for the flatbed type scanners having a certainly large scanning mechanism, or a problem of a narrow scanning width for the handy type scanners, even though the handy type scanners have little problem of the portability. Further, problem of complicated manipulation lies in both types of the image scanners, although they are superior in resolution for obtaining image data of character documents or drawings.

Still more, after taking image data, an editing operation, or trimming, is needed for clipping a desired part from the image data, either in the electronic still camera or the image scanner.

For resolving these problems of the conventional image input devices, there have been proposed several devices applying mosaic methods, that is methods wherein image data of a necessary scope are synthesized from partial image data obtained with necessary resolution from an object divided into several parts, making use of the two-dimensional area sensor not expensive by thus compensating its limitation of scope width.

The mosaic methods applied in these devices can be classified into four types according to methods for obtaining the partial image data, as follows:

first method: synthesizing partial image data obtained with a plurality of cameras each taking a photo of each of divided parts of an object;

second method: synthesizing partial image data obtained by a plurality of CCD (Charge Coupled Device) units on which an image of an object is projected through a single optical system;

third method: synthesizing partial image data obtained with a camera by displacing an object; and fourth method: synthesizing partial image data obtained from an object by displacing a camera.

In the first method, of which an example is described in "Acquisition of Super High Definition Pictures by Processing Stereoscopic Images" by Aizawa et al., Technical Journal IE90-54, IEICE (the Institute of Electronics, Information and Communication Engineers), partial image data of each divided part of an object are taken by each of a plurality of cameras previously arranged for the object, and they are combined into image data of a desired scope. So, there is a necessity of distortion elimination for synthesizing from the partial image data obtained by cameras each having its own optical system, in addition to difficulty of arranging and preparing the camera positions appropriately.

In the second method, an optical picture focused by a single lens is received with a plurality of two-dimensional area sensors, for obtaining desired resolution by synthesizing partial image data taken therewith, such as described in "High Speed Still Image Reader using Optically Coupled Multi Area Sensors" by Uehira, the Journal of the IIEEJ (Institute of Image Electronics Engineers of Japan), Vol. 20, No. 3 (1991), pp. 203–208, or in "A Development of a Wide Scope Mosaic CCD Camera and a Prospect of Observational Cosmology" by Sekiguchi et al., BUTSURI, Vol. 47, No. 5 (1992), pp. 376–381, the Physical Society of Japan. Having a common optical system, camera operation such as focusing or exposure setting is not so difficult in the second method compared with ordinary cameras.

In these two methods, the resolution is improved making use of a plurality of two-dimensional area sensors, and so the resolution or the scope width is restricted by the limited pixel number of two-dimensional area sensors. The problem of editing operation is also left not improved, especially in the second method with two-dimensional area sensors generally arranged in a rectangle.

According to the third or the fourth methods, the partial image data of an object can be obtained by a single camera.

In the third method, of which an example is disclosed in a Japanese patent application by Kosaka, entitled "A Still Picture Input Device and a Method of Recording and Reproducing Still Pictures" and laid open as a Provisional Publication No. 96081/'91, the object is displaced for obtaining its partial image data by a fixed camera. So, a certainly large mechanism for the object displacement hinders portability of the whole system.

The fourth method, wherein the camera is displaced for obtaining the partial image data of a fixed object such as described in "A Hand-Scan Image Digitizer with an Ability for Realtime Assembling of Mosaic Pictures" by Okada et al., Technical Journal IE81-17, IE-ICE, or in a Japanese patent application by Mizoguchi et al., entitled "Image Input Device" and laid open as a Provisional Publication No. 259557/'94, enables the user to select desired parts of the object to be input by controlling the camera displacement, resolving the problem of trading off between the resolution and the scope width together with the posterior trimming.

However, even with the fourth method, there is left a problem, in these conventional mosaic methods, that an enormous calculation is needed for synthesizing the partial image data, which is to be performed referring to information extracted therefrom by analyzing patterns thereof, resulting in a high processing cost.

Furthermore, the mosaic method is susceptible of mis-synthesizing for an object with a monotonous texture having repeated patterns. For example, partial image data 401 and 402 illustrated in FIG. 15 may be synthesized into either image data 403 or image data 404 in the mosaic method and it can not be discriminated which are representing the correct object.

Still further, when the image input device, a CCD camera for example, is displaced manually, there may arise different distortions in different partial image data such as skews, magnifications or reductions, making correct synthesizing still more difficult.

These are problems of the mosaic method.

SUMMARY OF THE INVENTION

Therefore, a primary object of the present invention is to realize a still image reader which is able to obtain image data of a desired scope without sacrifice of resolution, by synthesizing partial image data obtained from an object by displacing a camera, sufficiently portable and not expensive at the same time, eliminating above described problems of the conventional still image readers according to the mosaic method.

In order to achieve the object, a multi-shot still image reader of the invention for synthesizing a whole image from plurality of partial images of an object each taken by a camera unit from each position different with each other comprises:

a position detector for detecting each position of the camera unit from where each of the plurality of partial images is taken;

a frame for unitizing the position detector and the camera unit and enabling displacement of the camera unit parallel to the object;

a partial image memory for storing data of the plurality of partial images;

means for converting said each position of the camera unit into a corresponding position of the whole image to be synthesized where said each of the plurality of partial images is to be positioned;

an image attribute table for storing attribute information including the corresponding position and a correction vector thereof for each of the plurality of partial images;

means for calculating candidate vectors for each of the plurality of partial images referring to characteristic of the camera unit and the position detector, the candidate vectors indicating at least probable displacement from the corresponding position to coordinates where said each of the plulrality of partial images to be synthesized;

means for selecting the correction vector to be stored in the image attribute table most appropriate among the candidate vectors by positioning trials of said each of the plurality of partial images referring to said each of the plurality of partial images, the attribute information and the candidate vectors for said each of the plurality of partial images; and means for synthesizing each of the plurality of partial images into the whole image according to the attribute information for said each of the plurality of partial images.

Therefore, there can be eliminated, in the invention, distortion of the partial images except for those caused along with parallel movement of the camera unit to the object, nor degradation of synthesized image because of the mis-synthesizing partial images having no interrelation by checking the position of the partial images.

An automatic acquisition of the partial images can be also performed in the invention by referring to positional information detected by the position detector.

Further, by limiting positioning trial in the candidate space, calculation time needed for correct positioning can be effectively reduced and a correct positioning can be performed even for a partial image having a texture of a monotonous pattern repeated in a cycle larger than the candidate space, in the invention.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts, and:

DETAILED DESCRIPTION OF THE PREFERRED EMBODIMENTS

Now, embodiments of the present invention will be described in connection with the drawings.

Figure 1:
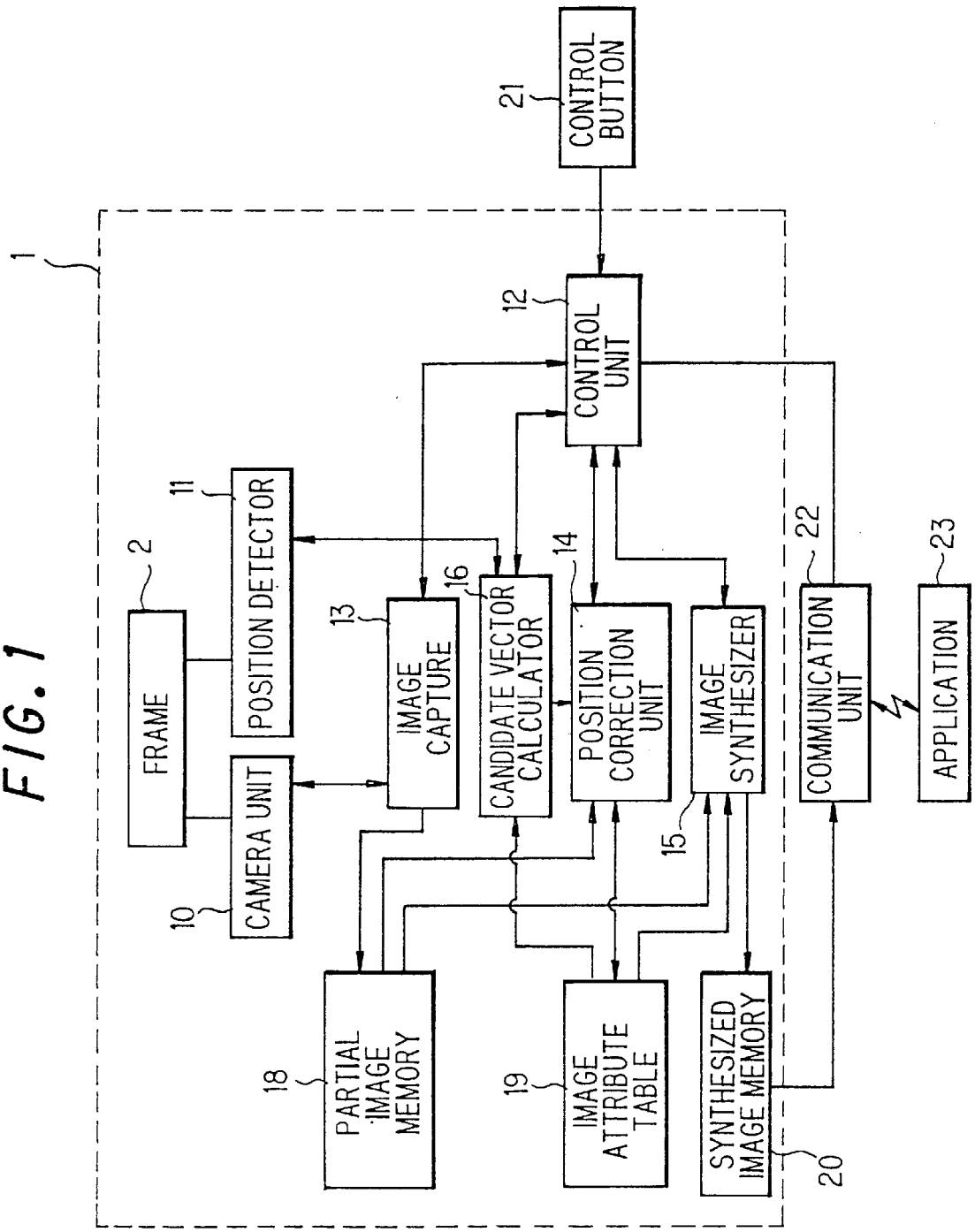
FIG. 1 is a bolck diagram for illustrating configuration of an embodiment of the invention.

FIG. 1 is a block diagram for illustrating configuration of an embodiment of the invention, wherein a multi-shot still image reader 1 comprises:

an camera unit 10 for obtaining partial image data of an object;

a position detector 11 for detecting positional information of the camera unit 10 relative to the object;

a frame 2 for unitizing the camera unit 10 and the position detector 11 with a fixed positional interrelation and enabling them to move maintaining a fixed distance to the object;

a partial image memory 18;

an image attribute table 19;

an image capture 13 for storing partial image data obtained by the camera unit 10 into the partial image memory 18;

a candidate vector calculator 16 for generating attribute information to be stored in the image attribute table 19 from positional information detected by the position detector 11 when the image capture 13 storing the image data, and calculating a candidate space giving an ensemble of proposal values (hereafter called the candidate vectors) of a correction vector to be registered also in the image attribute table 19 and used for positioning each partial image correctly, from the attribute information thus obtained;

a position correction unit 14 for selecting a most appropriate correction vector among the candidate vectors for each partial image by way of positioning trials of the partial image referring to the candidate space calculated for the partial image and attribute information prepared in the image attribute table 19, and revising the attribute information prepared therein according to the selection;

an image synthesizer 15 for obtaining synthesized image data of the object by synthesizing partial image data stored in the partial image memory 18 referring to the attribute information revised by the position correction unit 14;

a synthesized image memory 20 for storing the synthesized image data obtained by the image synthesizer 15;

a communication unit 22 for transmitting the synthesized image data outside to an application 23; and a control unit 12 for controlling processes performed in the multi-shot still image reader 1 according to user's instruction entered through control buttons 21 provided thereto.

Figure 2:
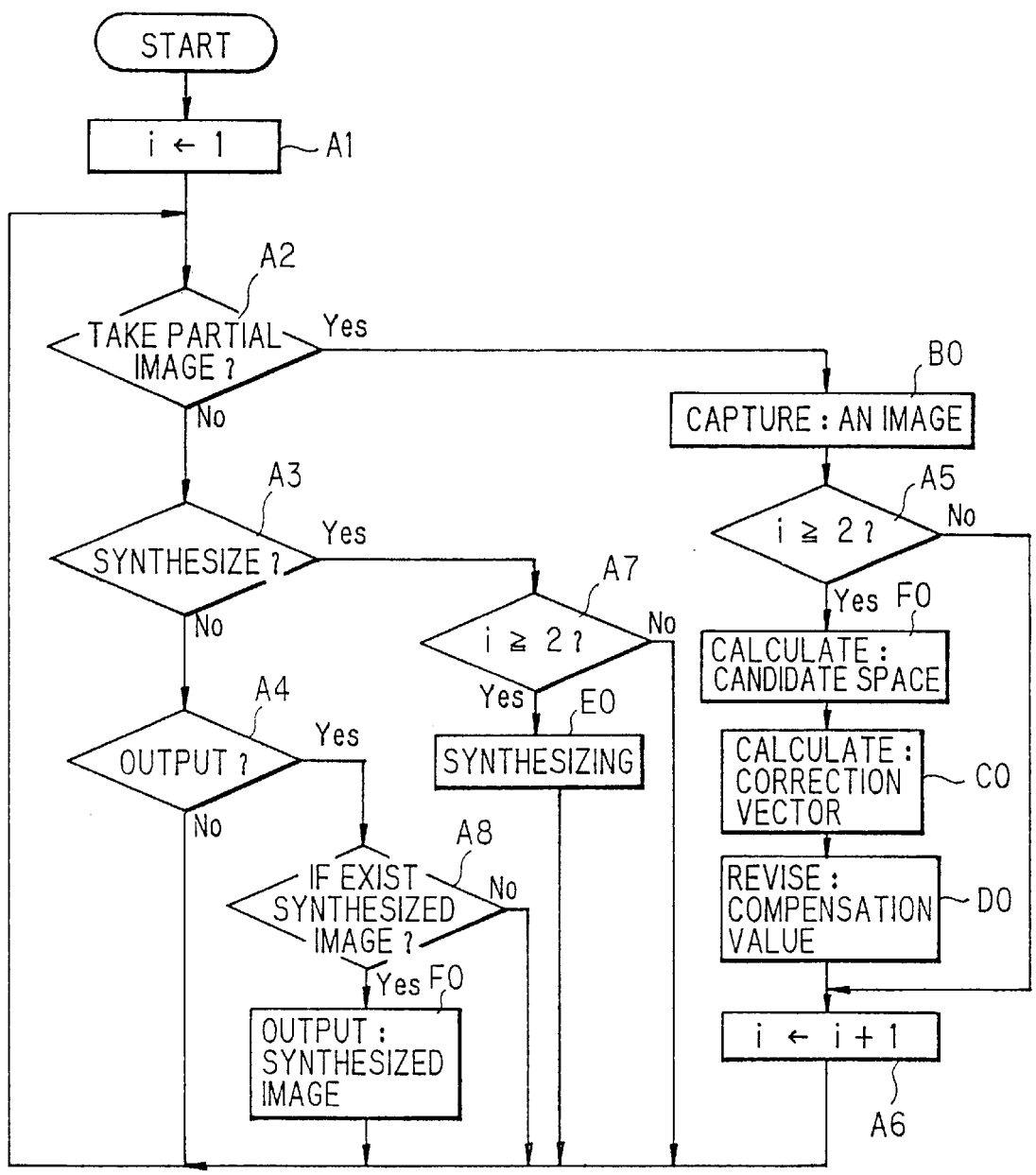
FIG. 2 is a flowchart illustrating processes performed in the embodiment of FIG. 1.

Now, operation of the embodiment is described referring to a flowchart of FIG. 2, illustrating processes performed in the embodiment.

Before acquisition of image data of an object, a first variable i indicating order of partial image to be taken is initialized (at step A1) by the control unit 12.

A user enters (at step A2) instructions through the control buttons 21 for taking data of partial images of the object, along with which smoothly displacing the image reading unit, that is, the combination of position detector 11 and the camera unit 10.

Figure 3:
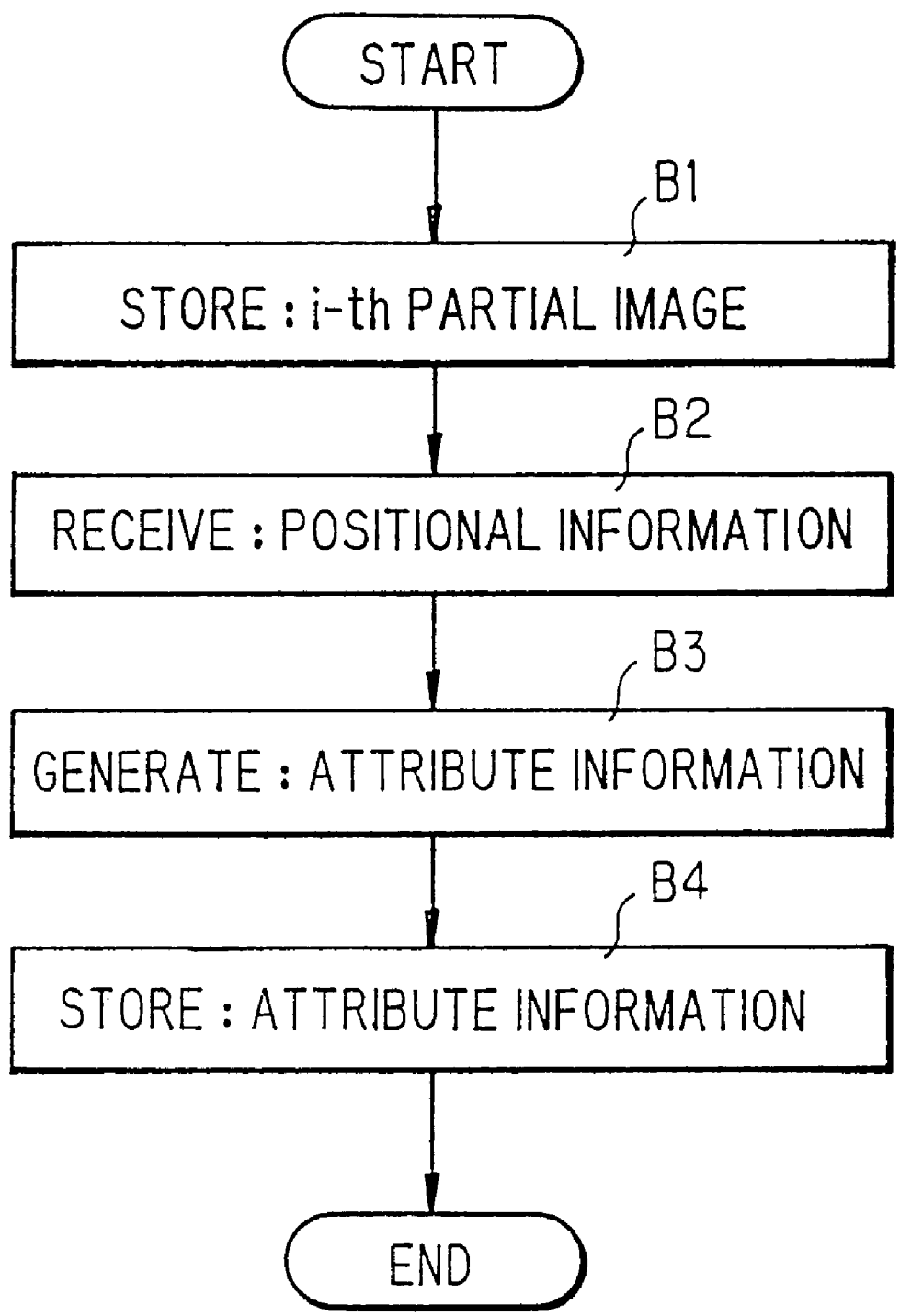
FIG. 3 is a flowchart illustrating detailed steps B1 to B4 performed in the step B0 of FIG. 2.

According to the instructions delivered through the control unit 12, the camera unit 10 takes (at step B0) data of the partial images to be stored in the partial image memory 18 by way of the image capture 13, and the candidate vector calculator 16 generates attribute information of each of the partial images to be stored in the image attribute table 19 by calculating position of each of the partial images according to output of the position detector 11, as shown in FIG. 3 illustrating detailed steps B1 to B4 performed in the step B0.

The position of each of the partial images may include an error, which is corrected by the correction unit 14, such as will be described in the following paragraphs.

Figures 4, 5:
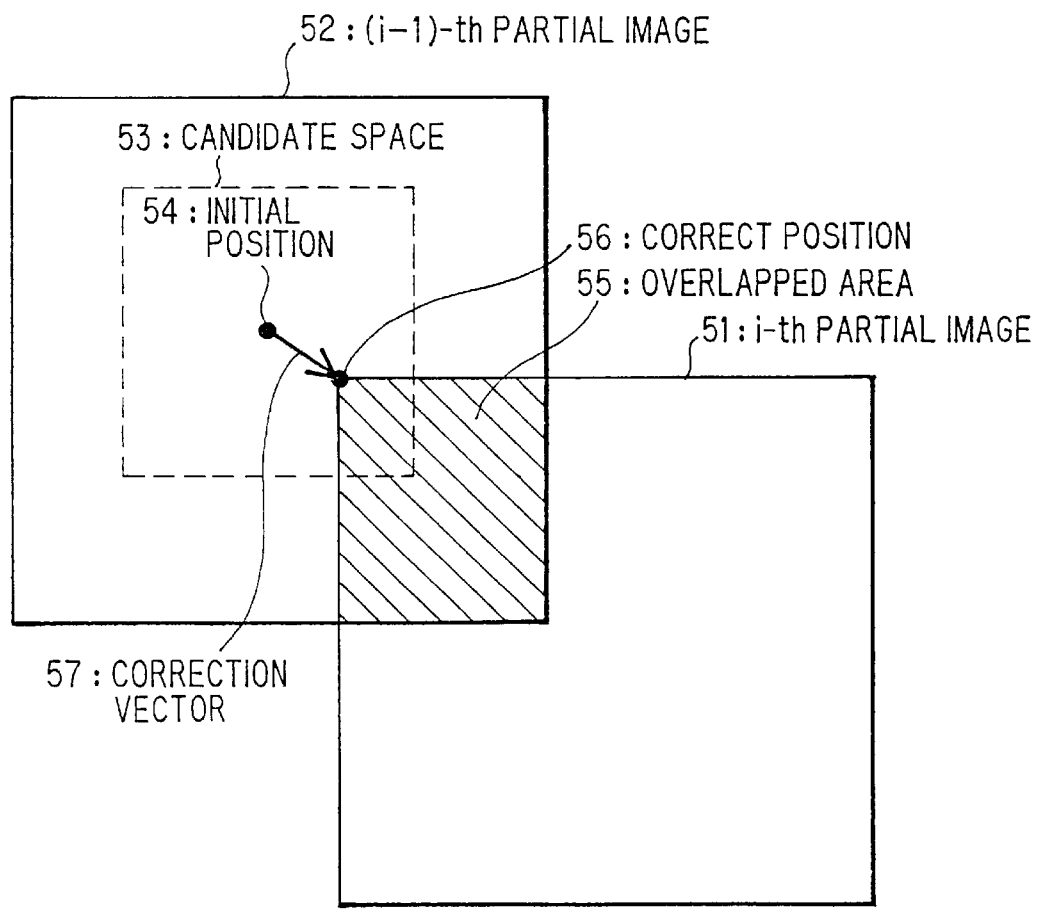
FIG. 4 shows an example of contents of the image attribute table 19 of FIG. 1.
FIG. 5 shows an example of an i-th partial image 201 taken following (i−1)-th partial image 202.

FIG. 4 shows an example of contents of the image attribute table 19, wherein each line represents attribute information for each partial image including initial position calculated by the candidate vector calculator 16 according to output of the position detector 11, and correction vector thereof. The correction vector of a newly taken partial image is reset to (0, 0).

Then, the candidate vector calculator 16 calculates (at step F0) a candidate space giving candidate vectors for the newly taken partial image (except for the first partial image, checked at step A5), considering output characteristic of the position detector 11, from which the correction vector for the partial image is selected (at step C0) by the correction unit 14, as follows.

For simplifying the description, a mouse type pointing device is assumed here, in the embodiment, to be applied for the position detector 11, and the image reading unit is displaced on a (X, Y) plane parallel to the object not rotating around a direction perpendicular to the (X, Y) plane.

The (X, Y) plane being expressed with pixel coordinates of the synthesized image data, the initial position $(X_i, Y_i)$ of i-th partial image represented by upper-left corner thereof is obtained as follows.

$$X_i = (M/L) \times x_i + \sum_{n=1}^{i-1} CX_n$$

$$Y_i = (M/L) \times y_i + \sum_{n=1}^{i-1} CY_n$$

where M and L are resolution of the camera unit 10, namely, that of the synthesized image data and resolution of the position detector 11, respectively, $x_i$ and $y_i$ are accumulations of outputs of the position detector 11 and $(CX_n, CY_n)$ is correction vector determined for n-th partial image.

With position detectors outputting displacement to be accumulated such as the mouse type pointing device having a rotary encoder, their errors are also accumulated. So, the initial position $(X_i, Y_i)$ is compensated with $(\Sigma_{n=1}^{i-1} CX_n, \Sigma_{n=1}^{i-1} CY_n)$. When a position detector outputting absolute position such as that making use of a magnetic sensor or a supersonic wave sensor is applied for the position detector 11, the compensation is not necessary.

Figure 6:
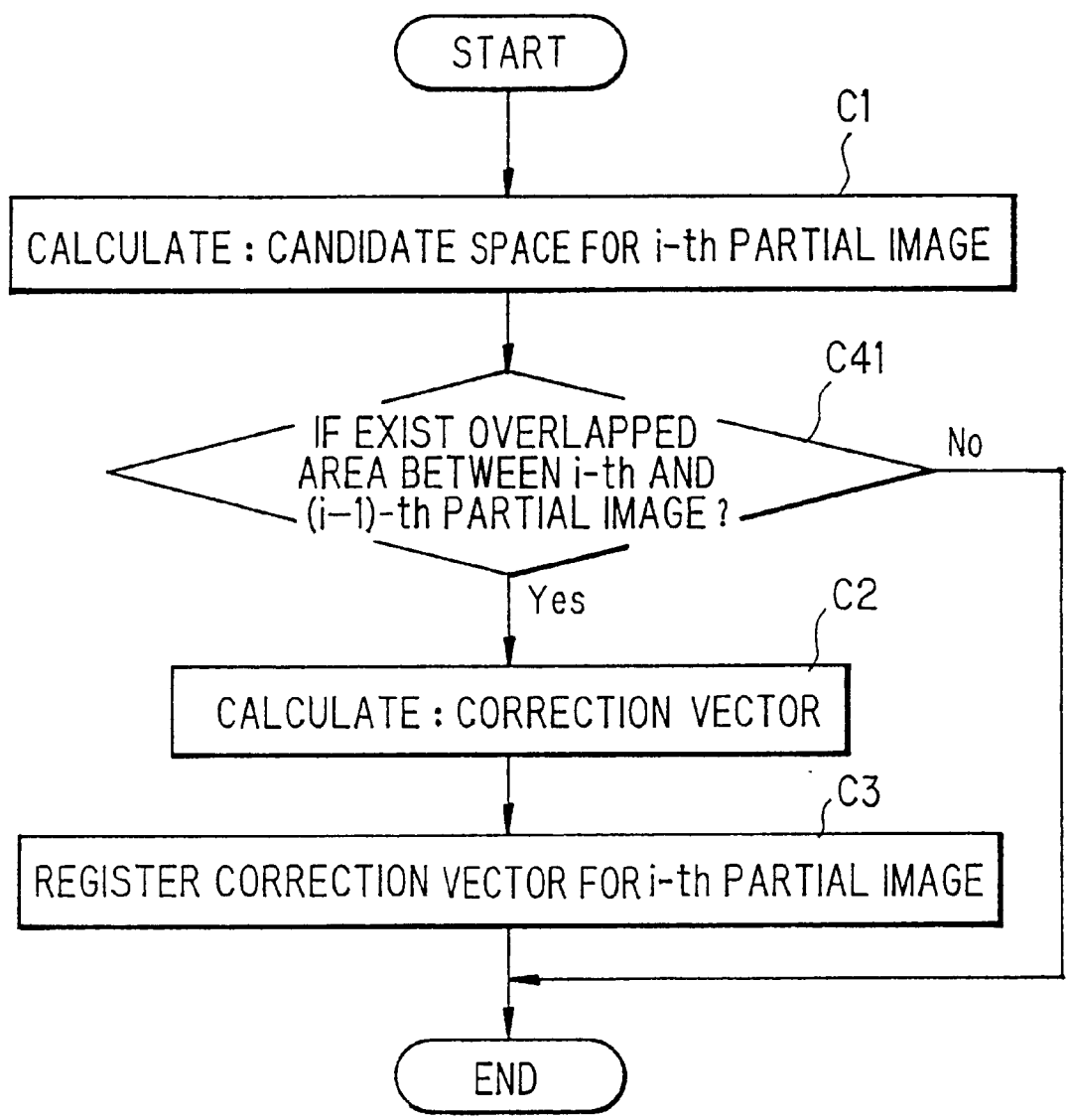
FIG. 6 is a flowchart illustrating detailed processes performed at steps F0 and C0 of FIG. 2.

FIG. 5 shows an example of an i-th (newly taken) partial image 51 taken following (i−1)-th partial image 52, for illustrating processes at steps F0 and C0, details of which are illustrated in FIG. 6.

First, coordinates $(X_i, Y_i)$ of the initial position 54 are calculated as above described, around which a candidate space 53 is selected. Each vector from the initial position 54 to coordinates of each pixel in the candidate space 53 is nominated (at step C1 of FIG. 6) as each of the candidate vectors, that is, each element of the ensemble of proposal values for the correction vector, in the embodiment.

Size or form of the candidate space 53 should be determined considering characteristic of the position detector 11 such as resolution or accuracy relative to the resolution of the camera unit 10. For obtaining the synthesized image data of 200 dpi with a mouse type pointing device having xy resolution of 400 dpi and accuracy of ±10%, for instance, a rectangular area of 40×40 pixels around the initial position 54 may be sufficient for the candidate space 53.

Then, displacing position of the i-th partial image 51 everywhere in the candidate space 53, its overlapped areas 55 of FIG. 5 with the (i−1)-th partial image 52 are extracted. When there is found (at step C4) no overlapped area, control process goes to termination without deciding the correction vector regarding that the i-th partial image 51 has no interrelation with the (i−1)-th partial image 52.

Calculating inter correlation coefficients for each overlapped areas 55 thus extracted of the i-th and the (i−1)-th partial images 51 and 52, a correct position 56 which gives the highest inter correlation coefficient is detected and the vector 57 from the initial position 54 to the correct position 56 is determined (at step C2) as the correction vector ($CX_i$, $CY_i$) of the i-th partial image 51 to be registered (at step C3) in the image attribute table 19.

Returning to FIG. 2, positional correction of each partial image is performed repeating these processes in the embodiment, revising (at step D0) the compensation values $\Sigma_{n=1}^{i-1}CX_n$ and $\Sigma_{n=1}^{i-1}CY_n$ with the correction vector ($CX_i$, $CY_i$) and incrementing (at step A6) the first variable i.

As heretofore described, the positioning or the correction trial of a partial image is performed only for its candidate vectors, that is, an ensemble of proposal values for the correction vector, namely, in a limited candidate space 53, calculated by the candidate vector calculator 16. Therefore, calculation amount needed for the positioning can be effectively reduced in the embodiment.

Further, correct positioning can be performed, in the embodiment, even for an object having a monotonous texture on condition that its repeating cycle of the same pattern is smaller than the candidate space 53.

Still further, degradation of the synthesized image because of mis-synthesizing partial images having no inter-relation can be eliminated by confirming (at step C4 of FIG. 6) overlapping of the partial images, which has been impossible in prior arts where positioning of partial images is performed according only to image information obtained from the partial images themselves.

As beforehand described, various sizes and forms of the candidate space 53 can be considered according to characteristic of the position detector 11. For example, the more accurate position detector enables the smaller candidate space, the more reducing calculation amount needed for the positioning. Size of the candidate space 53 may be determined variably according to distance from previous partial image, when error level of the position detector 11 depends on the distance. As for the form also, it may be a circle or a delta when it is appropriate to characteristic of the position detector or convenient for positioning calculation.

At step C2, the correction vector of a newly taken partial image 51 is determined referring to inter correlation coefficient of overlapped areas of the newly taken partial image 51 and its previously taken partial image 52 in the embodiment. However it may be determined, applying the present invention in the same way, according to any other conventional art, such as SSDA (Sequential Similarity Detection Algorithm) method, for instance, which is described in "ACM Computing Surveys '92", pp. 77–119 of *Computer Science*, (extra number of bit), Kyoritsu Shuppan, 1992, translation of "A Survey of Image Registration Techniques", *ACM Computing Surveys*, Vol. 24, No. 4, pp. 325–376.

Further, in the invention, positioning reference of the newly taken partial image must not be limited to its previously taken partial image, since an appropriate former taken partial image having an overlapped area with the newly taken partial image can be retrieved referring to the image attribute table 19 of the embodiment.

Still further, more than one partial image may be used for the positioning reference. In the case, the correction vector for the newly taken partial image may be determined as mean value of those obtained for each of the more than one partial image, or it is determined to be a correction vector giving a maximum inter correlation coefficient among those obtained for each of the more than one partial image, normalizing the inter correlation coefficients.

Thus, the user of the embodiment takes necessary and sufficient partial images of the object for obtaining a synthesized image of a desired scope.

Now, returning to FIG. 2, synthesizing process of the embodiment is described.

Detecting (at step A3) a user's instruction for synthesizing entered through the control buttons 21, the control unit 12 indicates the image synthesizer 15 to synthesize (at step E0) the partial images stored (confirmed at step A7) in the partial image memory 18.

Figure 7:
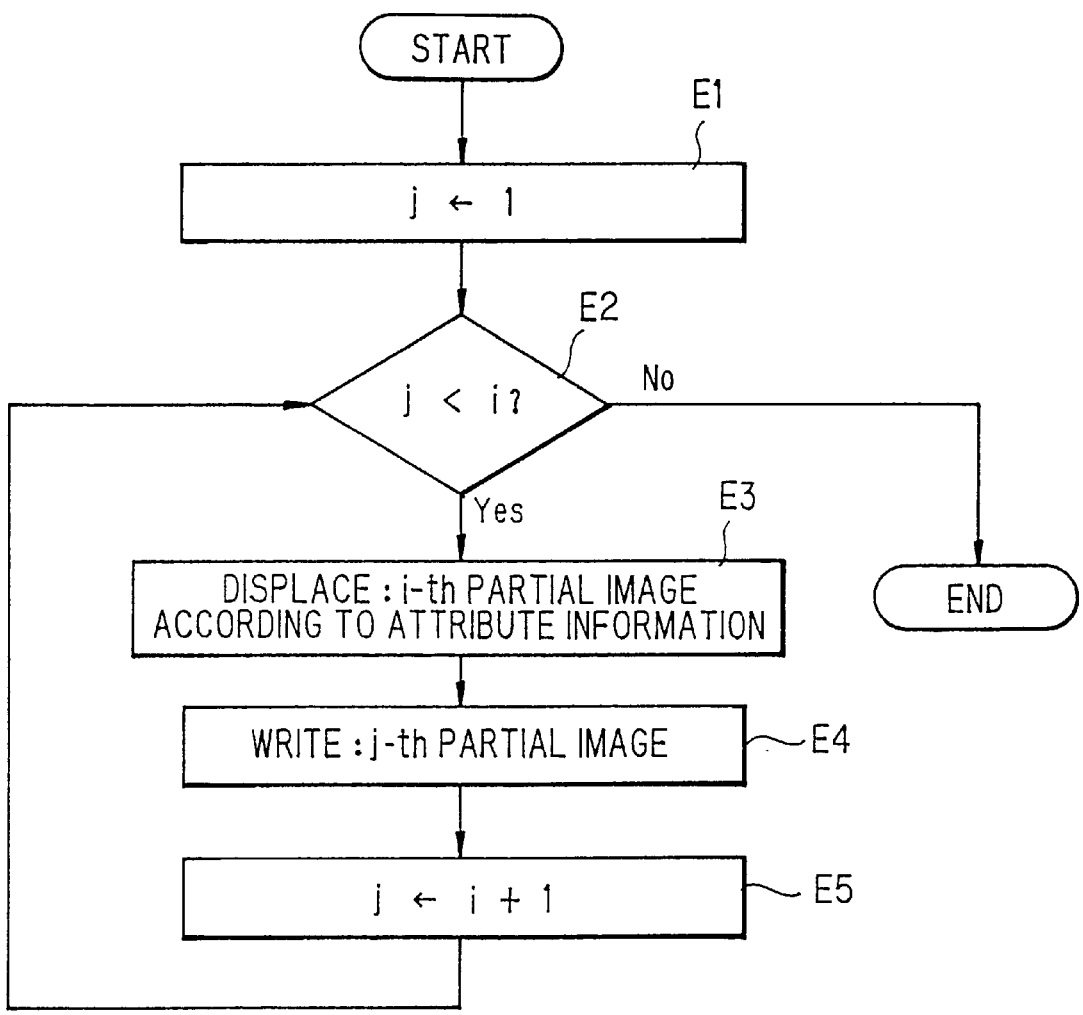
FIG. 7 is a flowchart illustrating detailed steps E1 to E5 performed at the step E0 of FIG. 2.

FIG. 7 is a flowchart illustrating detailed steps E1 to E5 performed at the step E0 of FIG. 2.

Controlled to synthesize the partial images, the image synthesizer 15 initializes (at step E1) a second variable j indicating number of partial image to be synthesized to '1'. Confirming there is still left a partial image to be synthesized comparing (at step E2) the second variable j to the first variable i left indicating number of next partial image to be taken, the image synthesizer 15 proceeds to the synthesizing, that is, to calculate (at step E3) coordinates ($X_{mj}$, $Y_{mj}$) in the (X, Y) plane where the j-th partial image is to be positioned referring to the image attribute table 19 as follows;

$$X_{mj}=X_j+CX_j$$
$$Y_{mj}=Y_j+CY_j$$

and to write data of the j-th partial image read out of the partial image memory 18 into the synthesized image memory 20 at addresses corresponding to coordinates thus calculated.

Thus, every partial image prepared in the partial image memory 18 is synthesized into a synthesized image in the synthesized image memory 20, repeating the processes by incrementing the second variable j (at step E5).

As for method of generating a synthesized image from partial images making use of their corrected positions, any conventional method can be applied, such as method described in pp. 462–467 of "Image Analysis Handbook", Tokyo University Press, for example, and intricate description is omitted.

Returning to FIG. 2, thus synthesized image in the synthesized image memory 20 (confirmed at step A8) is transmitted (at step F0) outside to the application 23 through the communication unit 22, when indicated (at step A4) by the user.

In the embodiment, the partial images are described to be taken indicated through control buttons 21 by a user and synthesized also according to the user's instruction. However, according to the invention, the control unit 12 itself can indicate the camera unit 10 to take a partial image, every time when displacement of the image reading unit becomes larger than a threshold value. In the case, every pair of two successive partial images can be arranged to have interrelation between them, by preparing the threshold value smaller than size of partial images. Or, each partial image may be synthesized into synthesized image determining the correction vector each by each when it is taken, instead of synthesizing partial images previously prepared in the partial image memory 18 according to user's instruction.

Still more, the partial image of the embodiment is described to be taken by the camera unit 10 not rotating around the direction perpendicular to the (X, Y) plane. However, even when its rotation is to be considered, the invention can be applied in a similar way, by considering a three-dimensional vector as the correction vector for each partial image.

For example, when a new (i-th) partial image is taken, the candidate vector calculator 16 registers an i-th initial position ($X_i$, $Y_i$, $\theta_i$), where the $\theta_i$ is the rotation angel detected by way of a position and rotation detector, applied for the position detector 11, capable of detecting its rotation angle, and calculated by the candidate vector calculator 16 considering characteristic of the position and rotation detector.

The candidate vector calculator 16 generates a three-dimensional candidate space (cube or sphere, for example) in a (X, Y, θ) space corresponding to the two-dimensional candidate space 53 of FIG. 5, restricting range of θ in an appropriate value according to accuracy of the position and rotation detector.

The correction unit 14 selects most appropriate three-dimensional vector as the correction vector to be registered in the image attribute table 19, among vectors from the initial position to each coordinates in the candidate space.

Thus, a correct synthesized image can be obtained with reduced calculation, according to the invention, even when rotation of partial image is considered.

Furthermore, even when the position detector 11 can not detect rotation angle, it is easily understood that the invention retains its effect by regarding the component $\theta_i$ of the initial position to be registered in the image attribute table 19 as '0' and prepareing the candidate space according to rotation error level accompanying manual displacement of the image reading unit.

In the following paragraphs, some examples of a mouse type multi-shot still image reader will be described as examples of a more concrete embodiment of the invention.

Figure 8:
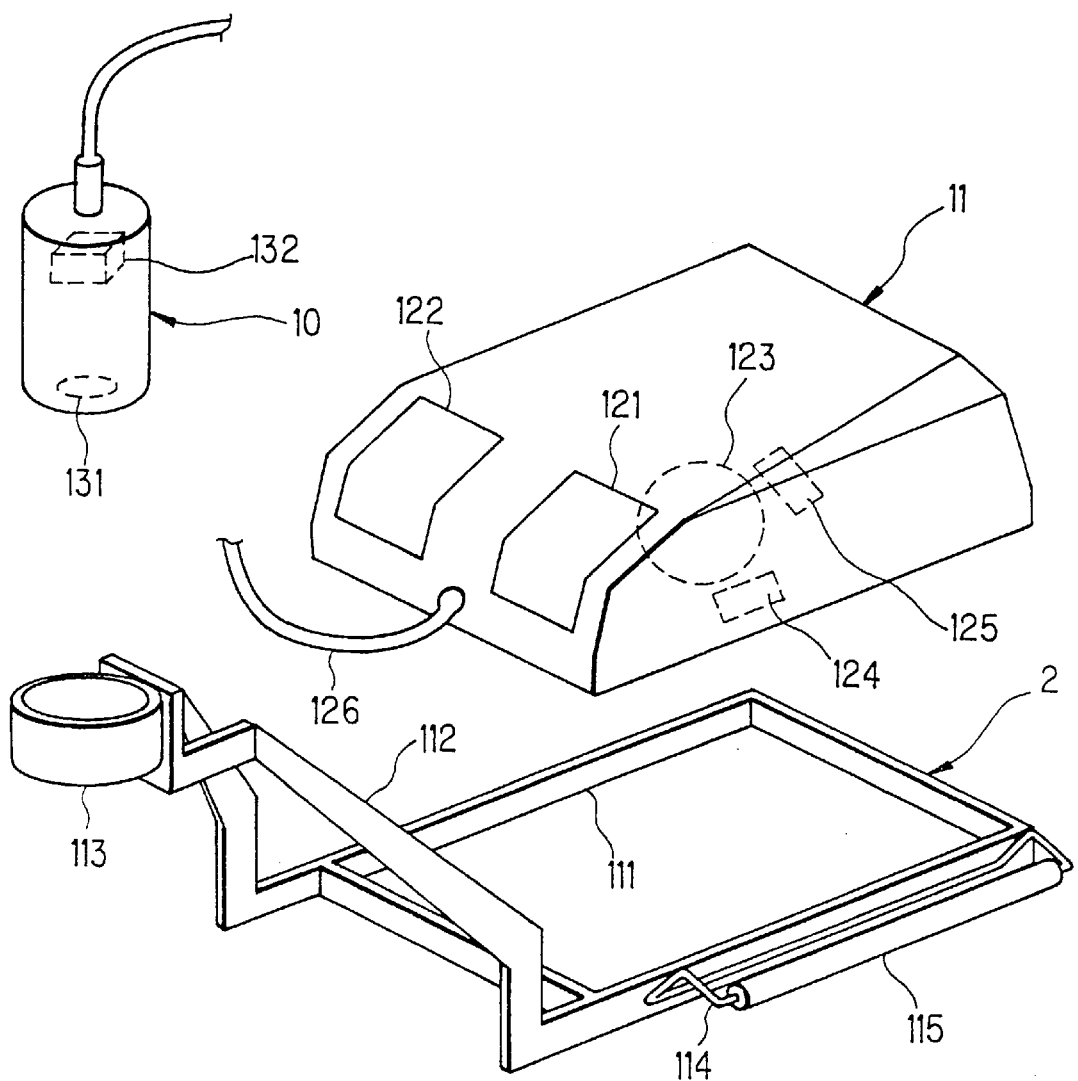
FIG. 8 is a perspective view of an image reading unit 100 applied in another embodiment of the present invention.

FIG. 8 shows a perspective view of an example of an image reading unit 100 applied in the embodiment, having a mouse 11, a micro video-camera 10 and a mouse adapter 2 for unitizing them.

The mouse adapter 2, corresponding to the frame 2 of FIG. 1, comprises an adapter frame 111, a camera arm 112, a camera holder 113, a roller shaft 114 and a roller 115, unitized with each other.

The mouse 11 corresponding to the position detector 11 of FIG. 1, where can be applied any appropriate ordinary mouse type pointing device, comprises a left and a right buttons 121 and 122 provided in its upper surface, a ball 123 engaged in its lower surface, two orthogonal rotary encoders 124 and 125 for detecting rotation of the ball 123, and a cable 126 for outputting information of each operation of the right and the left buttons 121 and 122, and information of relative movement of the mouse 11 detected by the orthogonal rotary encoders 124 and 125.

The micro video-camera 10 corresponding to the camera unit 10 of FIG. 1, where can be applied also any appropriate ordinary micro video-camera, comprises a lens 131 and a two-dimensional CCD sensor 132 for outputting image data of an object converted into a video signal such as NTSC signal, YCrCb signal or RGB signal.

The mouse 11 being engaged in the adapter frame 111 and the micro video-camera 10 being engaged in the camera holder 113 of the mouse adapter 2 compose the image reading unit 100 together with the mouse adapter 2.

In the image reading unit 100, the roller shaft 114 is prepared to be lifted to and locked at an upper position, upper than and parallel to a horizontal plane surrounded by lower edges of the adapter frame 111 and to be pulled down to and locked at a lower position, lower than and parallel to the horizontal plane. When the roller shaft 114 is locked at the upper position, the roller 115, able to rotate around the roller shaft 114 and having a rubber coated surface, for example, is set apart from a mouse operating plane, that is, a plane with which the ball 123 is rolled, while it is set to contact with the mouse operating plane when the roller shaft 114 is set at the lower position.

Therefore, movement of the image reading unit 100 can be restricted by friction of the roller 115 with the mouse operating plane by locking the roller shaft 114 at the lower position, within a direction perpendicular to the roller shaft 114 provided in up-down direction in the embodiment, from movement of the ordinary mouse having originally three degrees of freedom, in right-left direction, up-down direction and rotating direction.

Thus, with the roller shaft 114 set at the lower position, a high accurate displacement in right-left direction of the image reading unit 100 can be realized by softly manipulating the mouse 11 in the direction, guaranteeing ordinary mouse displacement with the three degrees of freedom as well, by manipulating it with an intention.

Figure 9:
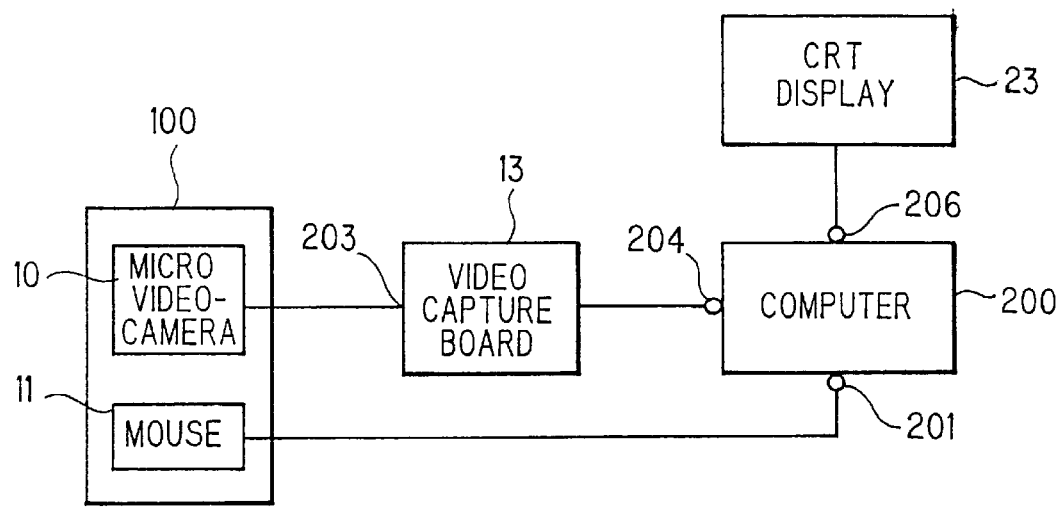
FIG. 9 is a block diagram illustrating a mouse type multi-shot image reader of the embodiment wherein the image reading unit 100 of FIG. 8 is applied.

FIG. 9 is a block diagram illustrating a mouse type multi-shot image reader of the embodiment wherein the image reading unit 100 of FIG. 8 is applied, and the same numerals indicate the same or corresponding parts to those in FIG. 1.

Referring to FIG. 9, the mouse 11 is connected to a mouse connector 201 of a computer 200, the micro video-camera 10 is connected to a video capture board 13 provided in an extra slot 204 of the computer 200, and a CRT display 23 is connected to a CRT connector 206 of the computer 200.

Figure 10:
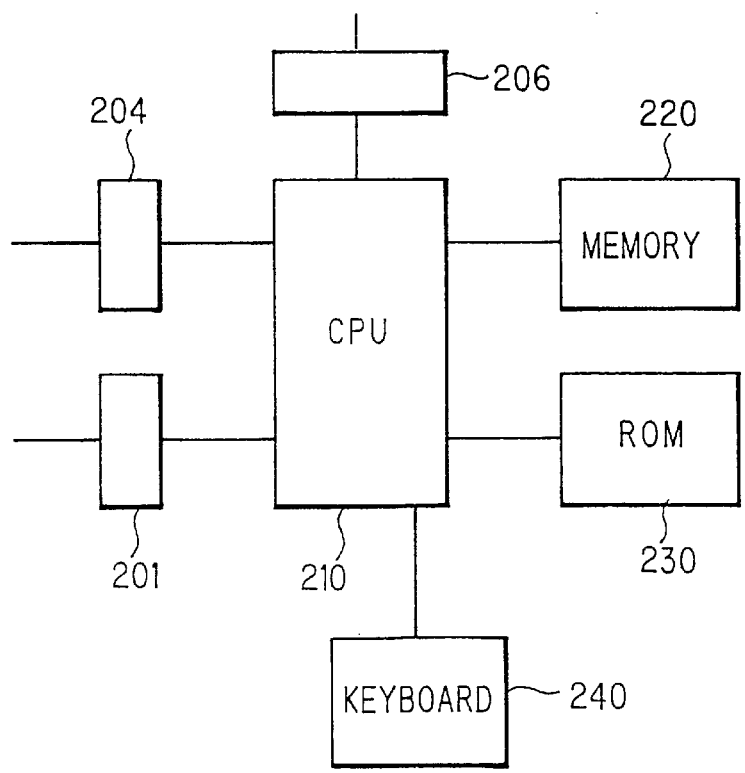
FIG. 10 is a block diagram illustrating the computer 200 of FIG. 8.

FIG. 10 is a block diagram illustrating the computer 200 of FIG. 9 having a CPU 210 provided with a memory 220 and a ROM 230 for processing data supplied through the mouse connector 201, the extra slot 204 and a keyboard 240, and outputting display data to the CRT display 23 through the CRT connector 206.

In the embodiment, the partial image memory 18, the attribute table 19 and the synthesized image memory 20 of FIG. 1 is prepared in the memory 220 of FIG. 10 and the control unit 12, the correction unit 14, the image synthesizer 15, the candidate vector calculator 16 and the communication unit 22 of FIG. 1 are realized with the CPU 210 performing necessary processes according to basic programs prepared in the ROM 230 and application programs stored in the memory 220.

Figure 11:
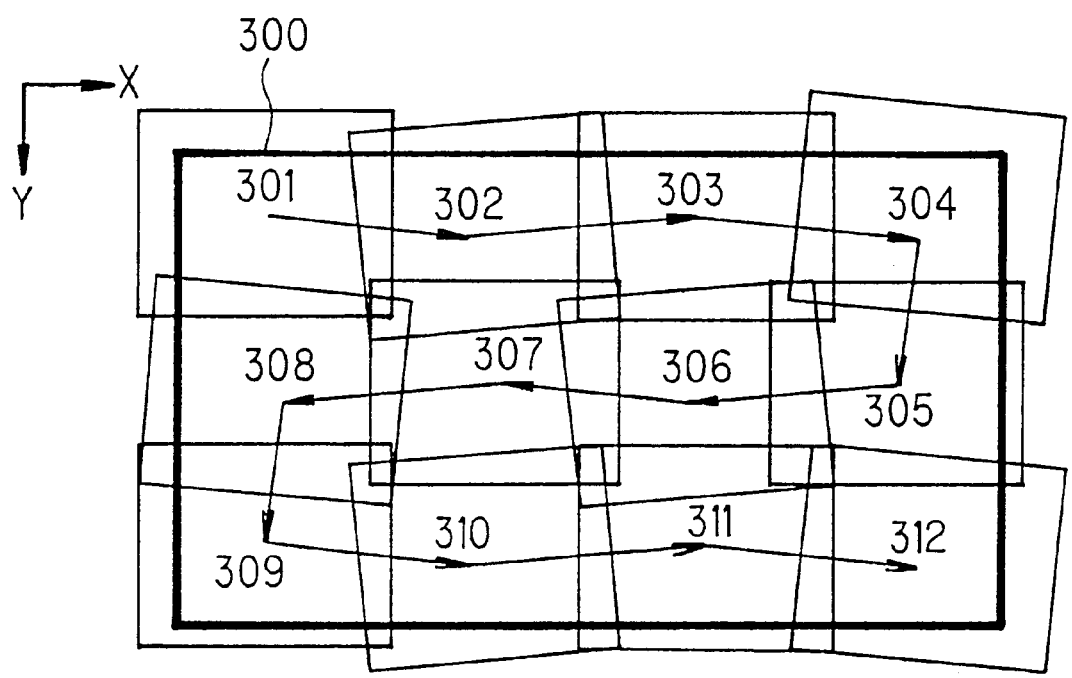
FIG. 11 illustrates an object 300 sufficiently larger than scope of the micro video-camera 10 of the image reading unit 100 of FIG. 8 with which partial images 301 to 312 of the object 300 are taken.

FIG. 11 illustrates an object 300 sufficiently larger than scope of the micro video-camera 10 of the image reading unit 100 with which partial images 301 to 312 of the object 300 are taken.

Setting the roller shaft 114 at the lower position, user arranges the image reading unit 100 so that the scope of the micro video-camera 10 focuses the upper left partial image 301 of the object 300 monitoring the CRT display 23 of FIG. 9 representing camera's eye, and clicks the left button 121 of the mouse 11 for taking the partial image 301 into the computer 200. Then the user displaces the image reading unit 100 rightward softly, enabling its parallel movement guided by the roller 115 without unnecessary up-down shift or rotation. Confirming the CRT display 23 displaying the next partial image 302 a little overlapped with the previous partial image 301, the user clicks the left button 121 for taking the next partial image 302. After taking the upper right partial image 304 by repeating the operation, the user displaces the image reading unit 100 downward intentionally for taking the middle right partial image 305.

Thus, the partial images 301 to 312 of the object 300 are taken in the embodiment.

Figure 12:
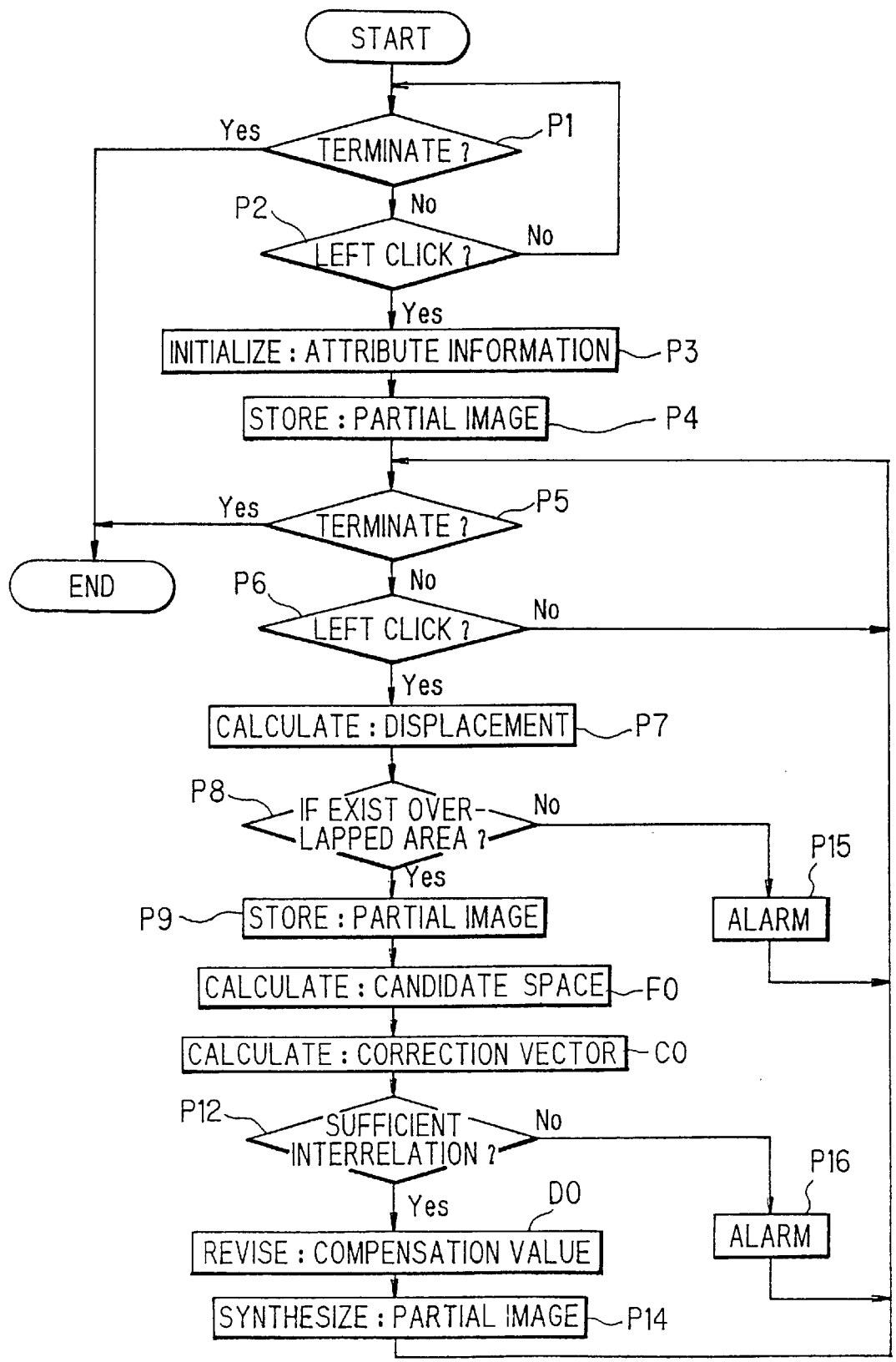
FIG. 12 is a flowchart illustrating an example of processes performed in the mouse type multi-shot still image reader of FIG. 9.

Now, operation of the embodiment is described for synthesizing a whole image of the object 300 of FIG. 11, by way of example, referring to a flowchart of FIG. 12 illustrating an example of processes performed in the mouse type multi-shot still image reader of FIG. 9, wherein each of partial images, 301 to 312 in the example, is synthesized each by each when it is taken.

When the user indicates (at step P1) to start synthesizing a wide scope image and clicks (at step P2) the left button 121 of the mouse 11 for taking the first partial image 301, the CPU 201 of the computer 200 initializes (at step P3) attribute information in the memory 220 indicating actual displacement of the mouse 11 and stores (at step P4) the partial image 301 in the memory 220.

For taking the following partial images 302 to 312, the CPU 210 calculates (at step P7) displacement of the mouse 11 from its position where previous partial image is taken when the left button is clicked (at step P6), and checks (at step P8) whether the displacement exceeds or not the scope of the micro video-camera 10.

When the displacement is found exceeding and there is no overlapped area, the CPU 210 outputs (at step P15) an alarm message to the CRT display 23 for urging the user to retake the partial image. Otherwise, the newly taken partial image is stored (at step P9) temporarily in the memory 220.

Then the CPU 210 calculates correction vector of the newly taken partial image (at steps F0 and C0) in the same way as described in connection with the flowchart of FIG. 6. In the flowchart of FIG. 12, when the normalized inter correlation coefficient is found (at step P12) lower than a threshold value, the CPU 210 outputs (at step P16) also an alarm message to CRT display 23 for urging the user to retake the partial image.

Making use of correction vector thus obtained, the newly taken partial image temporarily stored in the memory 220 is synthesized (at step P14) with already partially synthesized image in the memory 220.

When the user confirms with the CRT display 23 that the synthesized image of a desired scope is obtained by repeating these processes, a termination indication is entered (at step P5) through the keyboard 240 and the synthesizing process is terminated.

As beforehand described in connection with the embodiment of FIG. 1, any appropriate conventional method for finding correct position of a partial image or for synthesizing partial images making use of the obtained correct position can be applied also in the embodiment of FIG. 9 in the scope of the invention.

An ordinary micro video-camera and an ordinary mouse type pointing device can be applied for the micro video-camera 10 and the mouse 11 of the embodiment of FIG. 9 as previously described, and further, the roller shaft 114 and the roller 115 for restricting movement of the image reading unit 100 are not indispensable for the embodiment, when a more popular use is considered.

Figure 13B:
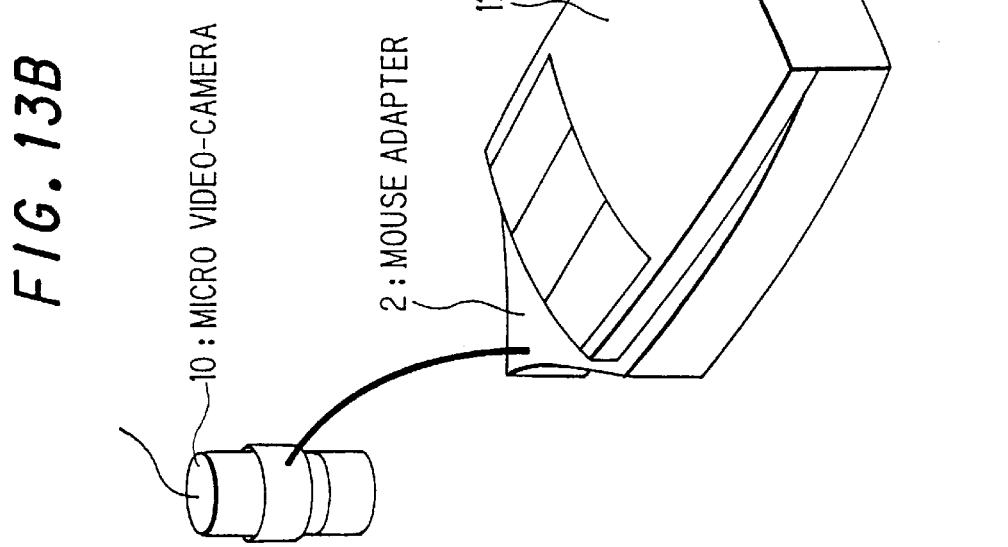
FIG. 13B is a perspective view illustrating components of FIG. 13A unitized into the image reading unit 100.
Figure 13A:
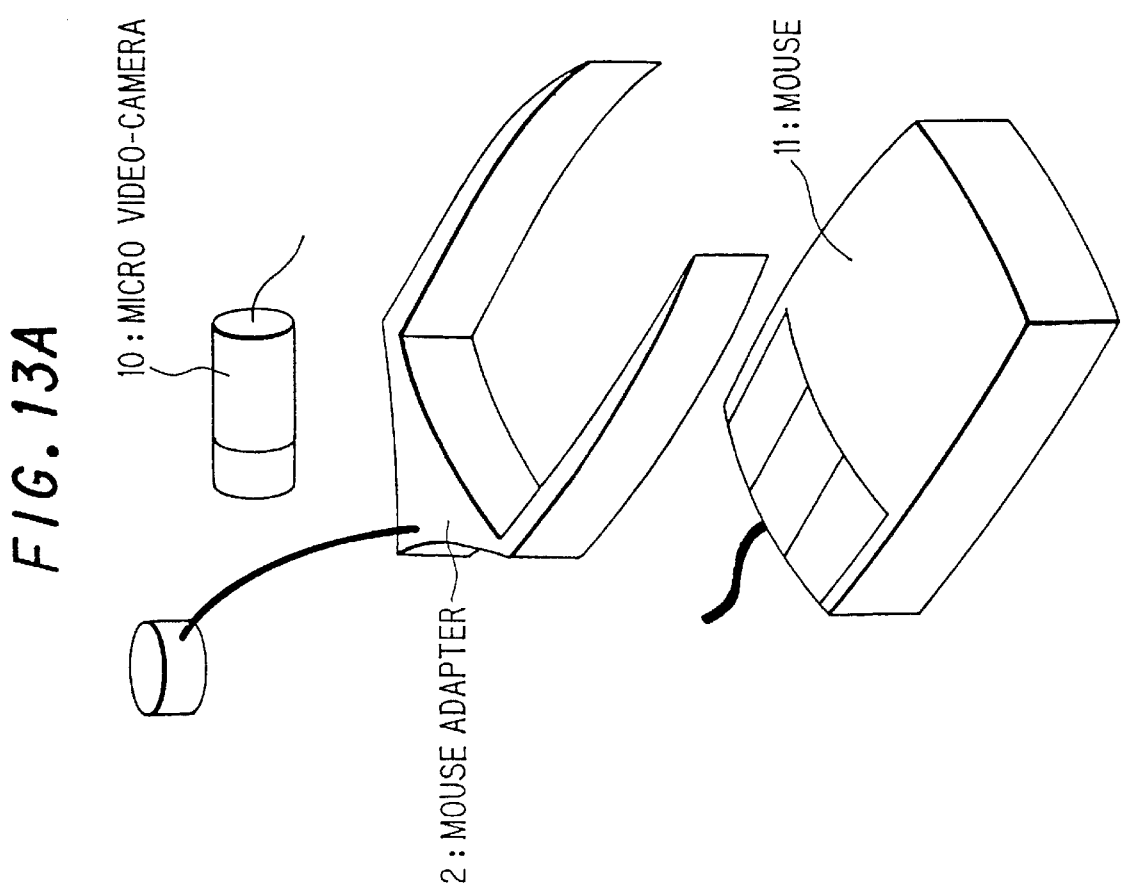
FIG. 13A is a perspective view illustrating components of another example of the image reading unit 100 to be applied in the embodiment of FIG. 9.

FIGS. 13A and 13B illustrate another example of the image reading unit 100, wherein the mouse adapter 2 is designed to be easily attached to, as shown in FIG. 13B, and detached from, as shown in FIG. 13A, the mouse 11, made of an elastic member for example. Therefore, a user can enjoy a high resolution still image of a desired scope simply with fewest additional parts making use of an ordinary personal computer set.

Figure 14:
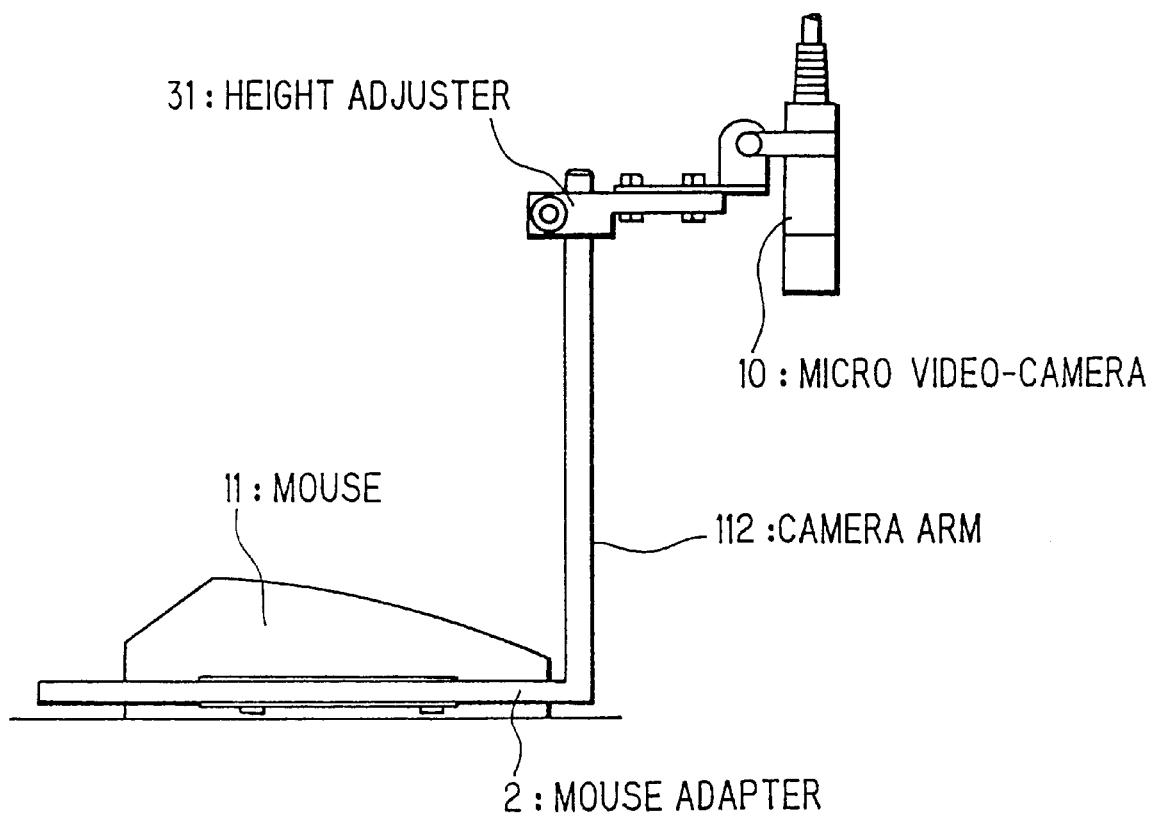
FIG. 14 shows a still another example of the image reading unit 100.
Figure 15:
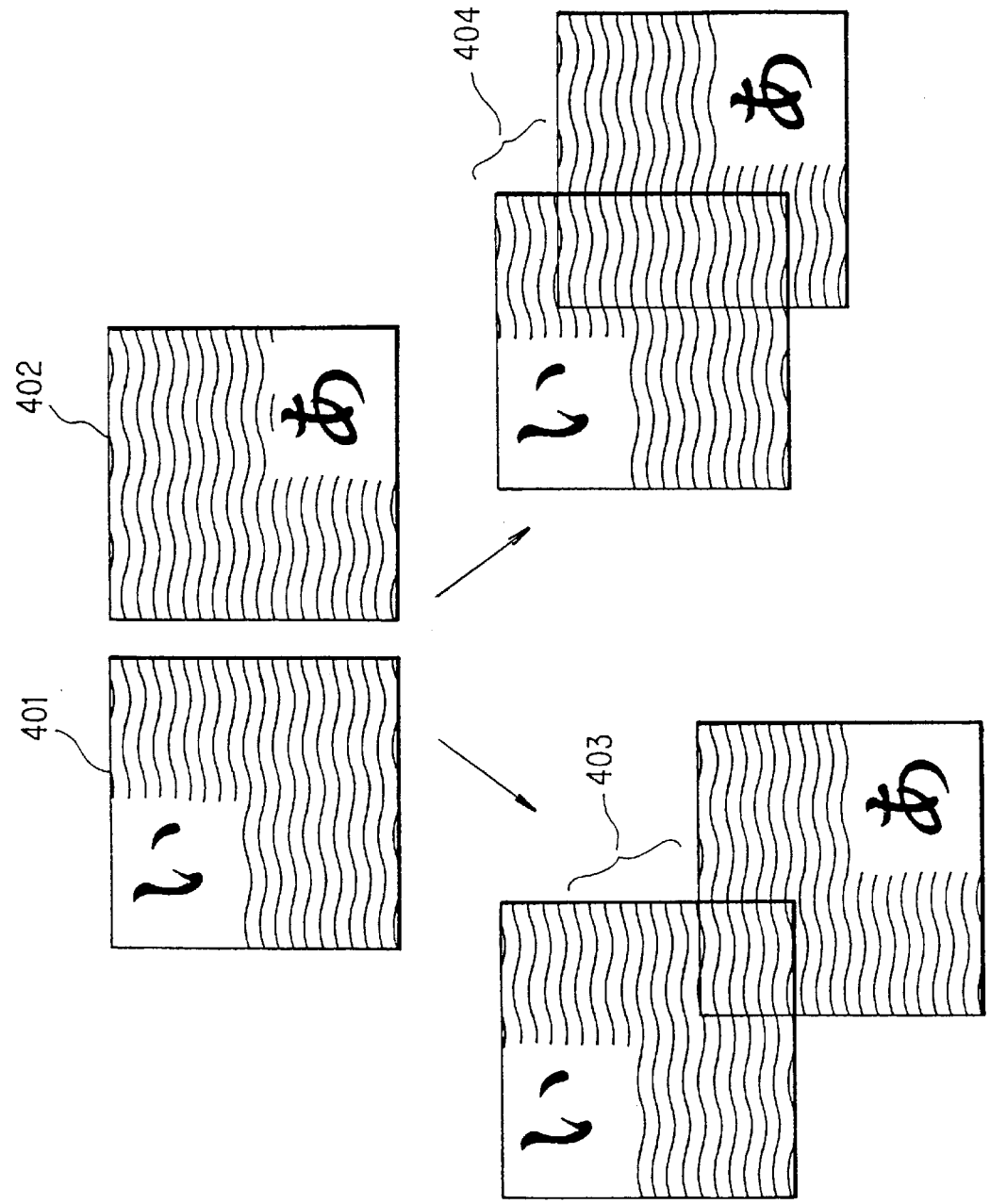
FIG. 15 illustrates an example of partial image data 401 and 402 to be synthesized into either image data 403 or image data 404 in a conventional mosaic method.

FIG. 14 shows a still another example of the image reading unit 100 of the embodiment, wherein a height adjuster 31 is further provided on the camera arm 112 of FIG. 8 for enabling to adjust distance between the micro video-camera 10 and the object.

With the image reading unit 100 of the example, a user can obtain a desired trade off between the resolution and the number of partial images, namely, calculation time for synthesizing object image of a desired scope, by adjusting the height of the micro video-camera 10 from the surface of an object.

What is claimed is:

1. A multi-shot still image reader for synthesizing a whole image from a plurality of partial images of an object each taken by a camera unit from a position where each position is different from each other; comprising:

a position detector for detecting each position of the camera unit from where each of the plurality of partial images is taken; and a frame for unitizing said position detector and the camera unit and enabling displacement of the camera unit parallel to the object;

further comprising:

means for calculating candidate vectors for each of the plurality of partial images referring to at least one characteristic of the camera unit and said position detector, a correction vector giving a correct position where said each of the plurality of partial images is to be synthesized being selected among said candidate vectors;

means for selecting said correction vector most appropriate among said candidate vectors by positioning trials of said each of the plurality of partial images referring to said candidate vectors; and means for synthesizing each of the plurality of partial images into the whole image according to said correction vector selected for said each of the plurality of partial images.

2. A multi-shot still image reader recited in claim 1; wherein said at least one characteristic of the camera unit and said position detector includes resolution of the camera unit and accuracy of said position detector.

3. A multi-shot still image reader for synthesizing a whole image from a plurality of partial images of an object each taken by a camera unit from a position where each position is different from each other; comprising:

a position detector for detecting each position of the camera unit from where each of the plurality of partial images is taken;

a frame for unitizing said position detector and the camera unit and enabling displacement of the camera unit parallel to the object;

a partial image memory for storing data of the plurality of partial images;

means for converting said each position of the camera un it into a corresponding position of the whole image to be synthesized where said each of the plurality of partial images is to be positioned;

an image attribute table for storing attribute information including said corresponding position and a correction vector thereof for each of the plurality of partial images;

means for calculating candidate vectors for each of the plurality of partial images referring to at least one characteristic of the camera unit and said position detector, said candidate vectors indicating at least probable displacement from said corresponding position to coordinates where said each of the plurality of partial images is to be synthesized;

means for selecting said correction vector to be sores in said image attribute table most appropriate among said candidate vectors by positioning trials of said each of the plurality of partial images referring to said each of the plurality of partial images, said attribute information and said candidate vectors for said each of the plurality of partial images; and means for synthesizing each of the plurality of partial images into the whole image according to said attribute information for said each of the plurality of partial images.

4. A multi-shot still image reader recited in claim 1; wherein said frame enables adjustment of distance between the camera unit and the object.

5. A multi-shot still image reader recited in claim 3; wherein said frame enables adjustment of distance between the camera unit and the object.

6. A multi-shot still image reader, comprising:

a mouse type pointing device;

a micro video-camera;

a mouse adapter for unitizing said mouse type pointing device and said micro video-camera;

a video-capture board for capturing video-signals of a plurality of partial images of an object taken by said micro video-camera;

means for calculating a synthesize position of a synthesized image where each of said plurality of partial images is to be positioned, from signals output from said mouse type pointing device;

means for correcting said synthesize position; and means for synthesizing each of said plurality of partial images into said synthesized image according to said synthesize position as corrected and further wherein said mouse adapter is releasably detachable from said mouse type pointing device whereby said micro video camera can be removed from said mouse-type pointing device.

7. A multi-shot still image reader recited in claim 6, wherein said mouse adapter comprises a friction roller for reducing operation time needed in said means for correcting said synthesize position by restricting movement of said mouse type pointing device into a direction.

8. A multi-shot still image reader recited in claim 7, wherein said friction roller is set to said mouse adapter with a roller shaft enabling setting said friction roller at one of an upper position and a lower position, movement of said mouse type pointing device being not restricted when said friction roller is set at said upper position.

9. A multi-shot still image reader recited in claim 6, wherein said mouse adapter enables adjustment of distance between said micro video camera and the object.

* * * * *